(12) United States Patent
Yap (10) Patent No.: US 11,342,993 B2
(45) Date of Patent: May 24, 2022

(54) SYSTEMS, METHODS, AND DEVICES FOR SPUR AND NOISE SUPPRESSED PHOTONIC LINKS

(71) Applicant: The Boeing Company, Chicago, IL (US)

(72) Inventor: Daniel Yap, Newbury Park, CA (US)

(73) Assignee: The Boeing Company, Chicago, IL (US)

( * ) Notice: Subject to any disclaimer, the term of this patent is extended or adjusted under 35 U.S.C. 154(b) by 103 days.

(21) Appl. No.: 16/805,588

(22) Filed: Feb. 28, 2020

(65) Prior Publication Data

US 2021/0273724 A1 Sep. 2, 2021

(51) Int. Cl.
*H04B 10/2575* (2013.01)
*H04B 10/077* (2013.01)
*H04B 10/50* (2013.01)
*H04B 10/61* (2013.01)

(52) U.S. Cl.
CPC ..... *H04B 10/2575* (2013.01); *H04B 10/0779* (2013.01); *H04B 10/50577* (2013.01); *H04B 10/61* (2013.01); *H04B 2210/006* (2013.01)

(58) Field of Classification Search
CPC ............ H04B 10/2575; H04B 10/0779; H04B 10/50577; H04B 10/61; H04B 2210/006
See application file for complete search history.

(56) References Cited

U.S. PATENT DOCUMENTS

| 5,532,857 A * | 7/1996 | Gertel | H04B 10/5057 398/183 |
| 6,115,162 A * | 9/2000 | Graves | H04B 10/60 398/1 |
| 2009/0263144 A1 | 10/2009 | McKinney | |
| 2020/0409229 A1 | 12/2020 | Morton et al. | |

FOREIGN PATENT DOCUMENTS

JP  2008228206 A  9/2008

OTHER PUBLICATIONS

European Application Serial No. 21158925.4, Search Report dated Aug. 2, 2021, 9 pgs.

(Continued)

*Primary Examiner* — Leslie C Pascal
(74) *Attorney, Agent, or Firm* — Kwan & Olynick LLP (57) ABSTRACT

Systems, methods, and devices are disclosed for implementing photonic links. Methods include transmitting light using an optical emitter, splitting, using an input coupler, the light into a first path and a second path, the first path being provided to a modulator, and the second path being provided to a phase shifter, and combining, using an output coupler, an output of the modulator and an output of the phase shifter. Methods further include identifying a modulator phase angle that reduces a third order distortion at an output of the output coupler, applying a first bias voltage to a modulator to maintain the identified modulator phase angle, and applying a control signal to the phase shifter to maintain a phase difference between an output of the modulator and an output of a phase shifter.

20 Claims, 7 Drawing Sheets

(56) References Cited

OTHER PUBLICATIONS

Li, Jian et al.; Intermodulation distortion elimination for analog photonics link based on integrated dual-parallel Mach-Zehnder modulator, 2014 Conference on Lasers and Electro-Optics (CLEO)—Laser Science to Photonic Applications, The Optical Society, Jun. 8, 2014, pp. 1-2.

Cox, Charles H. et al., "Limits on the Performance of RF-Over-Fiber Links and their Impact on Device Design", IEEE Transactions on Microwave Theory and Techniques, vol. 54, No. 2, Feb. 2006, pp. 906-920.

Ferreira, Ana et al., "Highly Linear Integrated Optical Transmitter for Subcarrier Multiplexed Systems", IEEE Photonics Technology Letters, vol. 21, No. 7, Apr. 1, 2009, pp. 438-440.

Higuma, K. et al., "X-Cut Lithium Niobate Optical Single-Sideband Modulator", Electronics Letters, vol. 37. No. 8, Apr. 12, 2001, pp. 515-516.

Li, Shangyuan et al., "Highly Linear Radio-Over-Fiber System Incorporating a Single-Drive Dual-Parallel Mach-Zehnder Modulator", IEEE Photonics Technology Letter, vol. 22. No. 24, Dec. 15. 2010, pp. 1775-1777.

Middleton, Charles et al., "Improved Microwave Photonic Link Performance through Optical Carrier Suppression and Balanced Coherent Heterodyne Detection", Proc. SPIE 7700, Enabling Photonics Technologies for Defense, Security, and Aerospace Applications VI, 770008, SPIEDigitalLibrary.org/conference-proceedings-of-spie, Apr. 16, 2010, 12 pgs.

Xie, X.B. et al., "Suppressed-Carrier Large-Dynamic-Range Heterodyned Microwave Fiber-Optic Link", International Topical Meeting on Microwave Photonics (IEEE), 2004, pp. 245-248.

\* cited by examiner

SYSTEMS, METHODS, AND DEVICES FOR SPUR AND NOISE SUPPRESSED PHOTONIC LINKS

TECHNICAL FIELD

This disclosure generally relates to communications links, and more specifically, to photonic links.

BACKGROUND

Photonic links may be communications links that enable the transmission of analog signals between various components of a system of electronics. For example, a first component may be coupled to a second component via a photonic link, and may send and receive signals via the photonic link. The photonic link may also provide an amount of isolation between such components, thus electrically isolating the first component from the second component. Accordingly, photonic links may be used where a component in a system of electronics may be subject to extreme operational conditions, such as lightning strikes. Various aspects of the configuration of conventional photonic links limit their dynamic range. For example, conventional photonic links may experience harmonic distortion as well as other transmission characteristics that limit their effective dynamic range, and limit their use in operational conditions.

SUMMARY

Disclosed herein are systems, methods, and devices for implementing photonic links. Methods include transmitting light using an optical emitter, splitting, using an input coupler, the light into a first path and a second path, the first path being provided to a modulator, and the second path being provided to a phase shifter, and combining, using an output coupler, an output of the modulator and an output of the phase shifter. Methods further include identifying a modulator phase angle that reduces a third order distortion at an output of the output coupler, applying a first bias voltage to a modulator to maintain the identified modulator phase angle, and applying a control signal to the phase shifter to maintain a phase difference between an output of the modulator and an output of a phase shifter.

In some embodiments, the methods further include coupling, using an output coupler, an output of the modulator and an output of the phase shifter, and monitoring an output of a photodetector coupled to an output of the output coupler. In various embodiments, the methods further include extracting a low frequency component and a fundamental frequency component of an output of a photodetector coupled to the output coupler. According to some embodiments, the methods further include determining the control signal based, at least in part, on the low frequency component and the fundamental frequency component. In some embodiments, the methods further include determining the control signal based, at least in part, on the low frequency component and the fundamental frequency component as well as the output of the modulator.

In various embodiments, the methods further include receiving, at the modulator, a radio frequency (RF) signal from an antenna. According to some embodiments, the antenna is mounted, at least in part, on an exterior surface of the aircraft. In some embodiments, the methods further include determining the first bias voltage by achieving a minimum value of a fundamental frequency of a test waveform. In various embodiments, the methods further include determining a second bias voltage to implement a phase offset from the first bias voltage, the phase offset suppressing a third order distortion.

Also disclosed herein are systems that include an optical emitter, an input coupler configured to split an output of the optical emitter into a first path and a second path, a modulator configured to modulate light transmitted along the first path based on an RF signal, and a phase shifter configured to modify a phase of light transmitted along the second path based on a bias voltage. Systems also include a controller configured to identify a modulator phase angle that reduces a third order distortion of the photonic link, apply a first bias voltage to the modulator to maintain the identified phase angle, and apply a control signal to the phase shifter to maintain a phase difference between an output of the modulator and an output of the phase shifter.

In some embodiments, the systems further include an output coupler coupled to the output of the modulator and the output of the phase shifter, and a photodetector coupled to an output of the output coupler. In various embodiments, the controller is configured to extract a low frequency component and a fundamental frequency component of an output of the photodetector. According to some embodiments, the controller is configured to determine the first bias voltage and the control signal based, at least in part, on the low frequency component and the fundamental frequency component. In some embodiments, the first bias voltage is applied to the modulator, and wherein the control signal is applied to the phase shifter. In various embodiments, the modulator is coupled to an antenna, and wherein the modulator and the antenna are implemented in a vehicle. According to some embodiments, the vehicle is an aircraft, and wherein the antenna is mounted, at least in part, on an exterior surface of the aircraft.

Further disclosed herein are devices that include a modulator configured to receive a first optical signal from an optical emitter via a first path, the modulator being configured to modulate light transmitted along the first path based on an RF signal, and a phase shifter configured to receive a second optical signal from the optical emitter via a second path, the phase shifter being configured to modify a phase of light transmitted along the second path based on a bias voltage. The devices further include a controller configured to identify a modulator phase angle that reduces a third order distortion of the photonic link, apply a first bias voltage to the modulator to maintain the identified phase angle, and apply a control signal to the phase shifter to maintain a phase difference between an output of the modulator and an output of the phase shifter.

In some embodiments, the modulator is coupled to an antenna, and the modulator and the antenna are implemented in an aircraft. In various embodiments, the controller is configured to extract a low frequency component and a fundamental frequency component of an output of the photodetector. According to some embodiments, the controller is configured to determine the first bias voltage and the control signal based, at least in part, on the low frequency component and the fundamental frequency component.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as to not unnecessarily obscure the described concepts. While some concepts will be described in conjunction with the specific examples, it will be understood that these examples are not intended to be limiting.

INTRODUCTION

Communications links and components within such links may have performance characteristics that effect operation of the communications links. For example, such communications links may include photonic links that experience distortion, such as intermodulation distortion, which may be caused by characteristics of the photonic links, such as harmonic resonances. Such photonic links may also experience signal noise. As will be discussed in greater detail below, such performance characteristics may, at least in part, determine an acceptable operational amplitude or intensity range of the photonic link, also referred to herein as its dynamic range. Conventional photonic links are limited in their ability to enhance their dynamic range because they are not able to suppress intermodulation distortion and reduce a noise figure concurrently. In various embodiments, a noise figure is the degradation in radio frequency (RF)-input to RF-output signal-to-noise ratio due to the photonic link. The noise figure may be represented in a dB scale, and a noise factor may be represented as a numerical value. In one example, the noise figure may be a ratio between a direct current (DC) photocurrent and the square of the photocurent at a signal frequency or a test waveform frequency, which, as will be discussed in greater detail below, are two components of an output of a photodetector.

Various embodiments disclosed herein provide photonic links that are configured to suppress intermodulation distortion and also reduce a noise figure to achieve an enhanced dynamic range. In various embodiments, a photonic link includes a modulator and a phase shifter as well as a controller configured to determine and generate bias and control voltages for both the modulator and phase shifter. Accordingly, an optical emitter, such as a laser, may provide an optical signal to both the modulator and the phase shifter. The controller may monitor signals produced by the modulator and phase shifter and may determine bias and control voltages to be applied to modulator and phase shifter. As will be discussed in greater detail below, the controller may utilize the applied voltages to maintain a relative phase angle between the two paths associated with the modulator and the phase shifter, while at the same time maintaining a particular phase angle of the modulator. In this way, the photonic link may simultaneously suppress distortion characteristics such as third order intermodulation distortion, and may also reduce the noise figure of the photonic link.

As will also be discussed in greater detail below, when the optical power incident on a photodetector is relatively high, as would be the case with positive photonic link gain, a noise figure of the photonic link may be dependent on the average photocurrent, since some contributions to the noise in the photonic link output are an optical emitter's relative intensity noise (RIN) and the shot noise of the light coupled to the photodetector. More specifically, a noise figure of a photonic link may be proportional to the average photocurrent, and a net RIN may be proportional to a square of the average photocurrent. Accordingly, photonic links disclosed herein are configured to enable the suppression of such noise (which may be from a large photocurrent) and also, at the same time, suppress the intermodulation distortion at various different operating points and operational conditions, including those where a signal gain is relatively large.

Examples of Photonic Links

Figure 1:
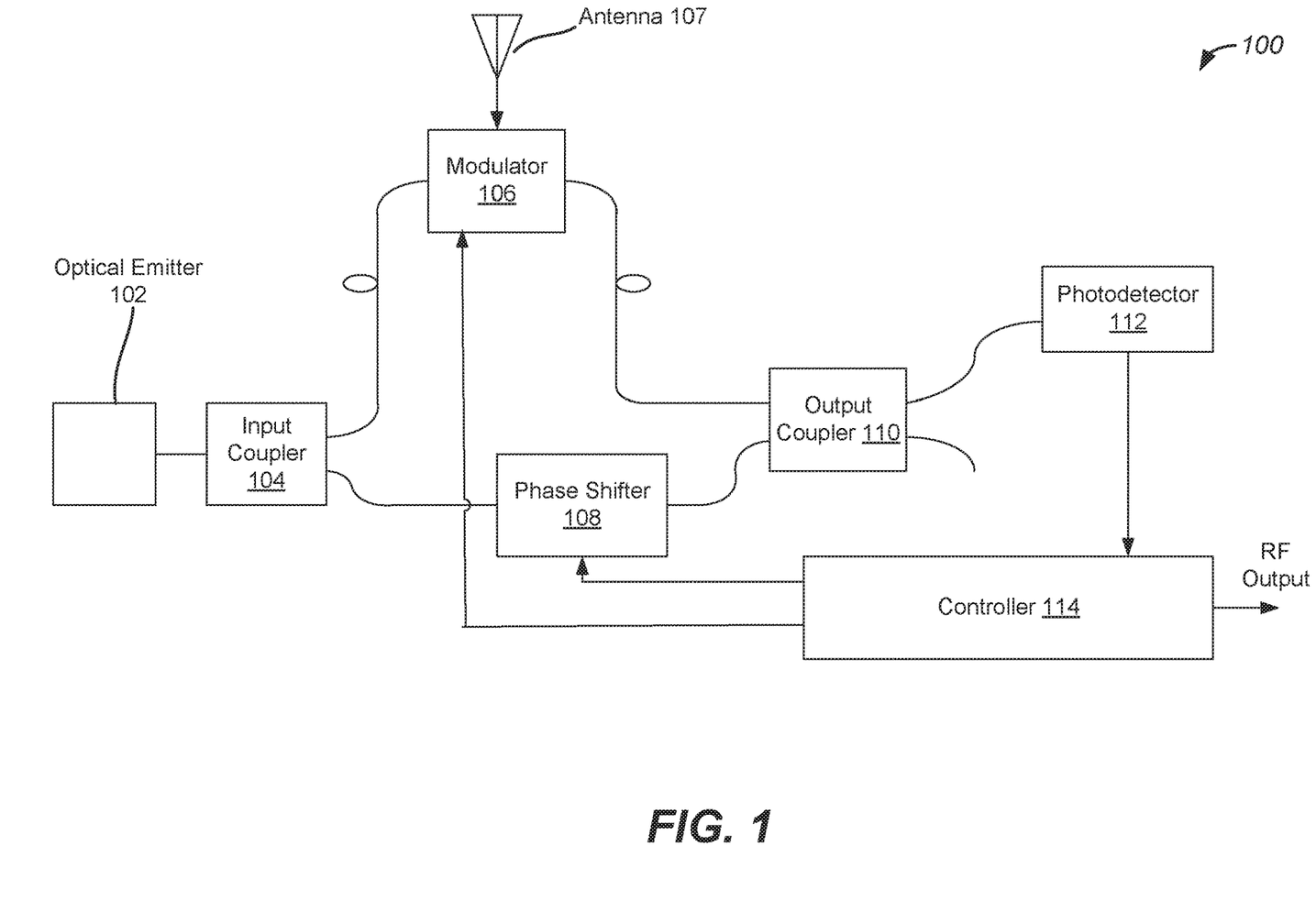
FIG. 1 illustrates an example of a photonic link, configured in accordance with some embodiments.

FIG. 1 illustrates an example of a photonic link, configured in accordance with some embodiments. In various embodiments, a system for implementing a photonic link, such as system 100, includes optical emitter 102 which is configured to emit light. For example, optical emitter 102 is a laser that is configured to emit a continuous laser beam with a controlled output, such as optical waveform or pulse duration and intensity. Accordingly, optical emitter 102 is configured to generate and provide an optical signal used by other downstream components of system 100. In various embodiments, optical emitter 102 is coupled with other downstream components via optical transmission mediums such as optical fibers.

As shown in FIG. 1, optical emitter 102 is coupled to input coupler 104. In various embodiments, input coupler 104 is configured to split the output provided by optical emitter 102 into a first path and a second path. As will be discussed in greater detail below, the first path is provided to a first component, such as modulator 106, and the second path is provided to a second component such as phase shifter 108. In various embodiments, input coupler 104 is a variable coupler that is configured to have a variable coupling ratio. Accordingly, input coupler 104 is configured to adjust a strength or amplitude of signals sent along the first path and the second path. In various embodiments, the operation of input coupler 104 and its variable coupling ratio are controlled by controller 114, also discussed in greater detail below.

In some embodiments, modulator 106 which is configured to modulate a signal received from input coupler 104. For example, modulator 106 receives an optical signal from input coupler 104 via the first path, and modulates the optical signal based on a received input. In one example, the modulation may be phase modulation. In some embodiments, modulator 106 is configured to receive an input from a source such as antenna 107. Accordingly, modulator 106 receives a radio frequency (RF) signal from antenna 107, and modulates the optical signal based on the received RF signal. In this way, the optical signal is modulated to encode information included in the RF signal, and the modulated optical signal is provided as an output of modulator 106. Moreover, in various embodiments, modulator 106 is configured to receive a signal from a controller, such as controller 114 that configures modulator 106 to maintain a designated bias angle. As will be discussed in greater detail below, the bias angle of modulator 106 may be identified and specified to reduce distortion that may otherwise occur in system 100. For example, a bias angle may be maintained such that a third order distortion is minimized.

According to various embodiments, phase shifter 108 is configured to receive an optical signal from input coupler 104 via the second path. Moreover, phase shifter 108 is configured to implement a shift in phase of the received signal based on a received input. As will be discussed in greater detail below, the input may be signal generated by controller 114. Accordingly, phase shifter 108 introduces a phase shift to the received signal and generates an output that includes the phase shift. As will also be discussed in greater detail below, phase shifter 108 is configured to maintain a relative phase angle between the first path and the second path. In various embodiments, a relative optical phase may produce destructive interference between the optical fields for the optical-carrier frequencies from the two paths, and the average optical power at an input of photodetector 112, discussed in greater detail below, can be reduced, and thus the noise figure of the photonic link can be reduced. Accordingly, the input to phase shifter 108 received from controller 114 may be used to adjust phase shifter 108 to maintain a designated phase angle between the first path and the second path, and reduce a noise figure of system 100.

System 100 further includes output coupler 110 which is configured to couple an output of modulator 106 and phase shifter 108 to a downstream component, such as photodetector 112 discussed in greater detail below. Thus, according to some embodiments, output coupler 110 is an optical coupler that is configured to provide the signals generated by modulator 106 and phase shifter 108 to photodetector 112 via a first output port. In some embodiments, output coupler 110 has multiple output ports that may include a second output port, and the second output port may be left uncoupled or hanging.

System 100 also includes photodetector 112 that is coupled to an output port of output coupler 110, and is configured to detect optical intensity of the signal received from output coupler 110. Accordingly, photodetector 112 is configured to detect the square of the optical field, and is configured to mix the optical signal received via the first path with the optical signal received via the second path. In this way, photodetector 112 is configured to mix modulated light, as well as its various modulation sidebands, received via the first path with the phase shifted light received via the second path.

System 100 additionally includes controller 114 which is configured to generate one or more signals that are provided to modulator 106 and phase shifter 108. As will be discussed in greater detail below, controller 114 is configured to generate a bias voltage that is used to set a bias angle of modulator 106. Controller 114 is further configured to generate a first control signal used to control and maintain a phase angle of modulator 106, and a second control signal used to control the operation of phase shifter 108 to maintain a phase difference between the first path and the second path. Additional details of the determination and generation of the bias voltage and control signals is discussed in greater detail below with reference to FIGS. 3-6. In various embodiments, controller 114 is further configured to generate an output which may be an RF output. Accordingly, the output of the controller may be an output of system 100, and an output of the photonic link.

Figure 2:
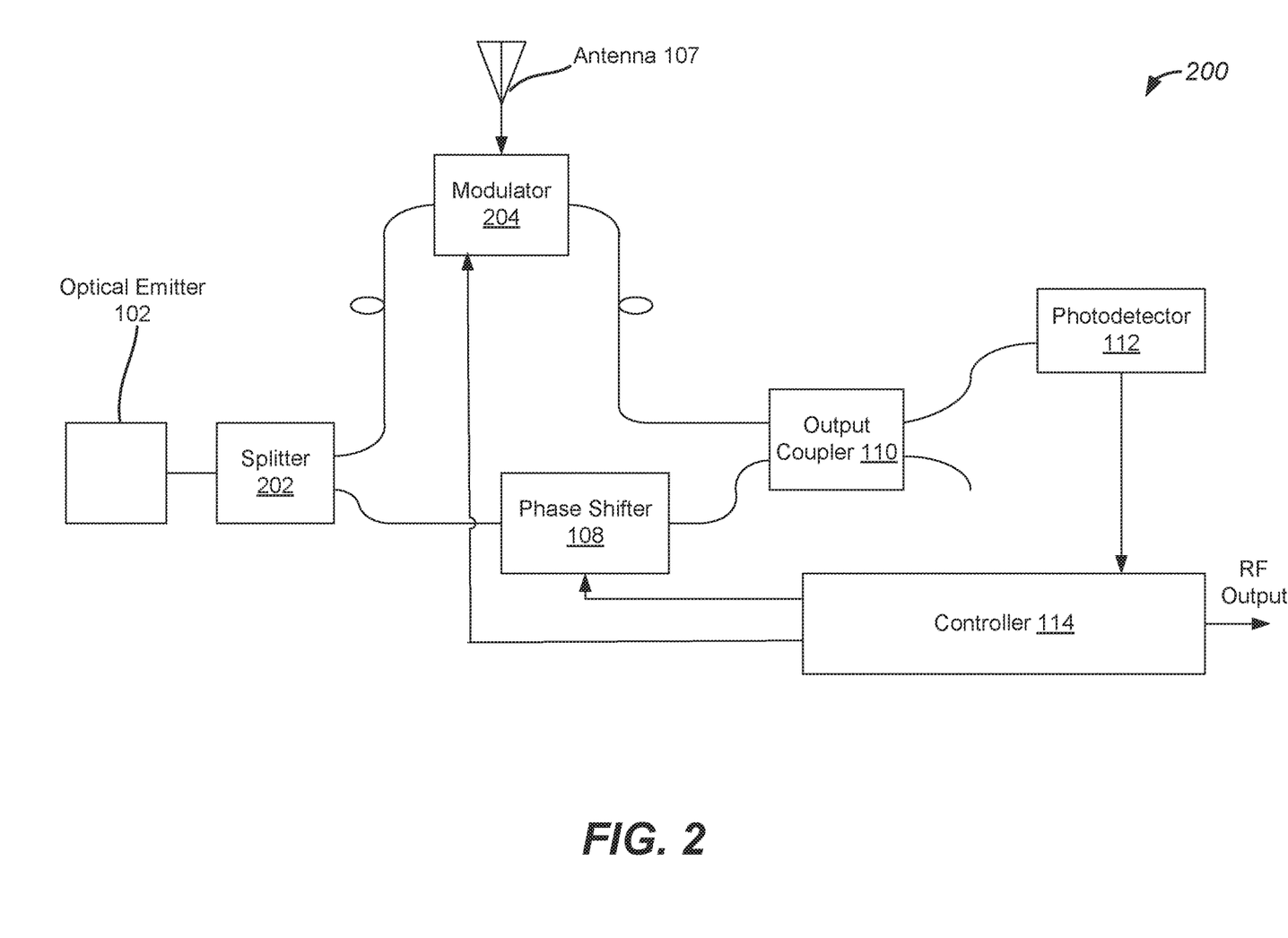
FIG. 2 illustrates another example of a photonic link, configured in accordance with some embodiments.

FIG. 2 illustrates another example of a photonic link, configured in accordance with some embodiments. As similarly discussed above, system 200 includes optical emitter 102, output coupler 110, photodetector 112, and controller 114. In various embodiments, system 200 further includes optical splitter 202, modulator 204, and phase shifter 108. In various embodiments, system 200 is configured such that optical splitter 202 is configured to split an optical signal generated by optical emitter 102, and provide a first optical signal to modulator 204 via a first path, and provide a second optical signal to phase shifter 108 via a second path. Moreover, in system 200 modulator 204 is configured to include an attenuator configured to implement a designated attenuation to the optical signal received via the first path. In this way, system 200 may be implemented using a simple optical splitter, such as optical splitter 202 instead of the variable coupler discussed above.

Figure 3:
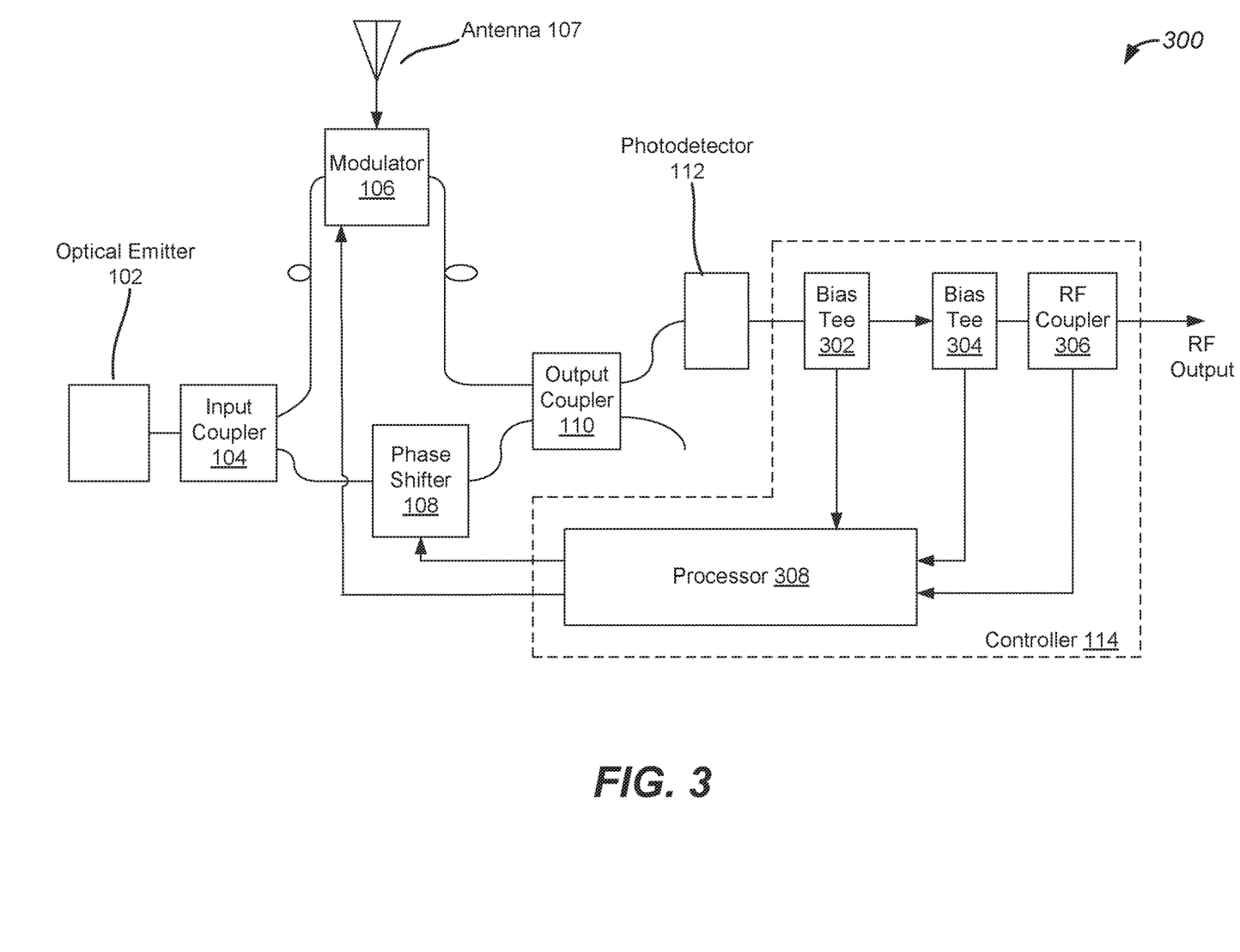
FIG. 3 illustrates an additional example of a photonic link, configured in accordance with some embodiments.

FIG. 3 illustrates an additional example of a photonic link, configured in accordance with some embodiments. As similarly discussed above, system 300 includes optical emitter 102, input coupler 104, modulator 106, phase shifter 108, output coupler 110, photodetector 112, and controller 114. As shown in FIG. 3, controller 114 may include various components configured to implement the determination and generation of the bias voltages and control signals discussed above. In various embodiments, controller 114 includes first bias tee 302, second bias tee 304, RF coupler 306, and processor 308.

In some embodiments, first bias tee 302 is configured to receive an output of photodetector 112, and is further configured as a diplexer that generates a low frequency output and a high frequency output. As shown in FIG. 3, the low frequency output is provided to processor 308, and the high frequency output is provided to second bias tee 304. In various embodiments, second bias tee 304 further generates two outputs based on the high frequency output received from first bias tee 302. More specifically, second bias tee 304 provides an output representing a fundamental frequency to processor 308, and provides an additional output including a higher frequency component to RF coupler 306. In various embodiments, RF coupler 306 is configured to provide an RF output at an output port, and also provide a third harmonic component to processor 308. In this way, controller 114 is configured to extract specific frequency components of the output of photodetector 112, and determine and generate bias voltages and control signals based on such extracted frequency components.

Figure 4:
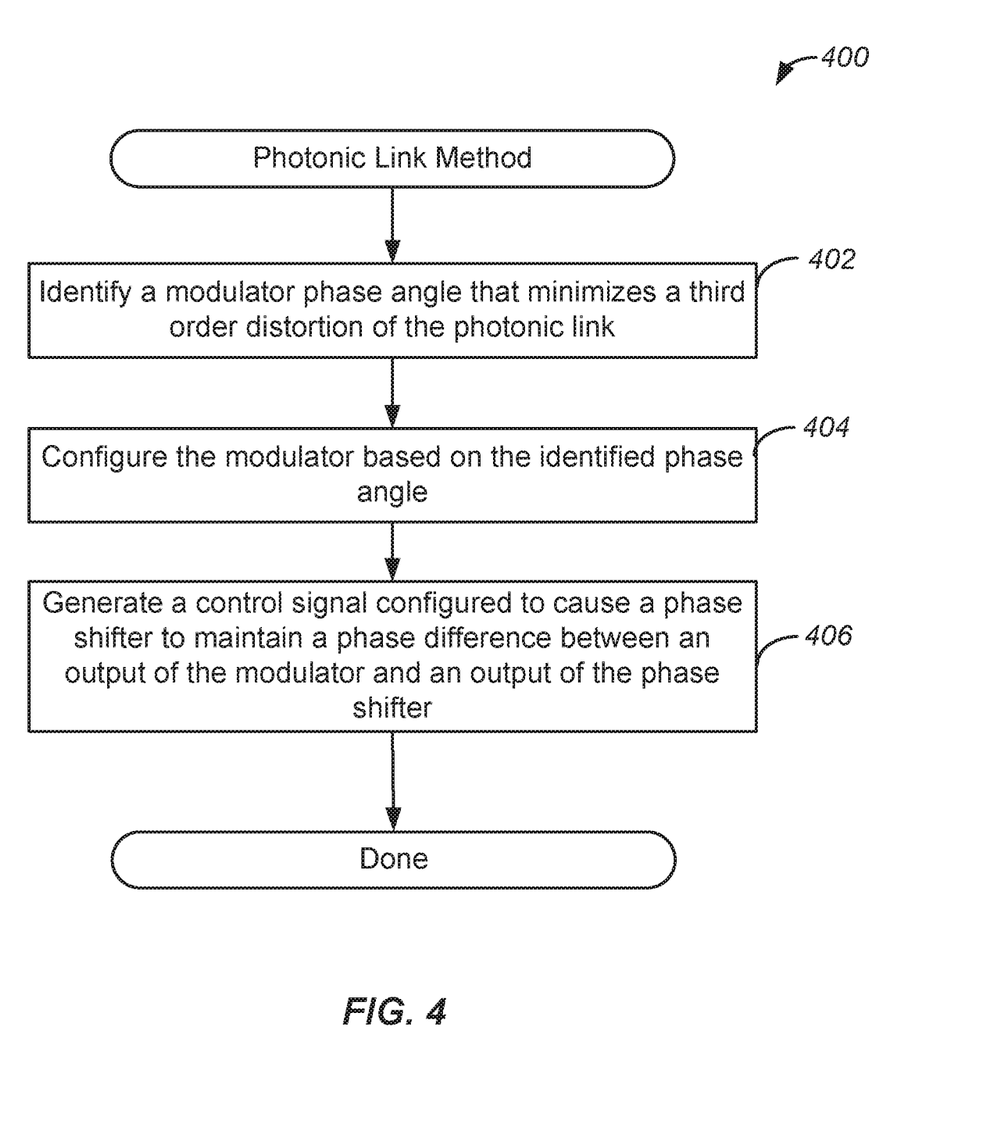
FIG. 4 illustrates a flow chart of a method of using a photonic link, implemented in accordance with some embodiments.

FIG. 4 illustrates a flow chart of a method of using a photonic link, implemented in accordance with some embodiments. As discussed above, the operation of modulators and phase shifters included in photonic links may be controlled by a controller to simultaneously suppress distortion characteristics of the photonic link as well as noise characteristics of the photonic link. Accordingly, a method, such as method 400, may be used to configure a modulator and phase shifter to suppress such distortion and noise characteristics, as well as generate control signals that maintain suppression of such distortion and noise characteristics during operation.

Method 400 may commence with operation 402 during which a phase angle may be identified for a modulator in a photonic link. Accordingly, a modulator phase angle may be identified that minimizes or reduces a third order distortion of the photonic link. As will be discussed in greater detail below with reference to FIGS. 5 and 6, the phase angle may be identified based on the utilization of a test waveform and a varying DC component to identify a phase angle at which a distortion characteristic, such as a third order distortion, is reduced, and in some embodiments, minimized.

Method 400 may proceed to operation 404 during which the modulator may be configured based on the identified phase angle. A system component, such as a controller, may generate a bias voltage and apply the bias voltage to the modulator to set the modulator phase angle to the identified phase angle. As will be discussed in greater detail below with reference to FIGS. 5 and 6, the setting of such a phase angle may reduce or minimize a third order distortion of the photonic link.

Method 400 may proceed to operation 406 during which a control signal may be generated. In various embodiments, the control signal is generated and provided to the phase shifter to maintain a phase difference between the modulator and the phase shifter. Accordingly, the control signal is configured to maintain the phase difference during operation of the photonic link, and thus account for any changes or drift in the phase of the modulator. In this way, noise characteristics of the photonic link may also be suppressed, and both distortion and noise characteristics may be suppressed simultaneously.

In various embodiments, an accumulated optical phase in each paths can fluctuate with changes in the thermal and mechanical environment. For example, a particular path may have 1 meter of a silica optical fiber. The temperature dependence of such fibers results in a change in the refractive index of the fiber and the accumulated phase shift is proportional to the length of the path and also dependent on the wavelength of the light. For example, for a path length of 1 meter, the accumulated shift would change by $0.13\pi$ (or a change in the relative phase angle $\phi_p$ of 23.3°) for each 0.01° C. change in temperature. Embodiments disclosed herein adjust the phase shifter to compensate for these drifts and thereby stabilize the value of $\phi_p$.

Figure 5:
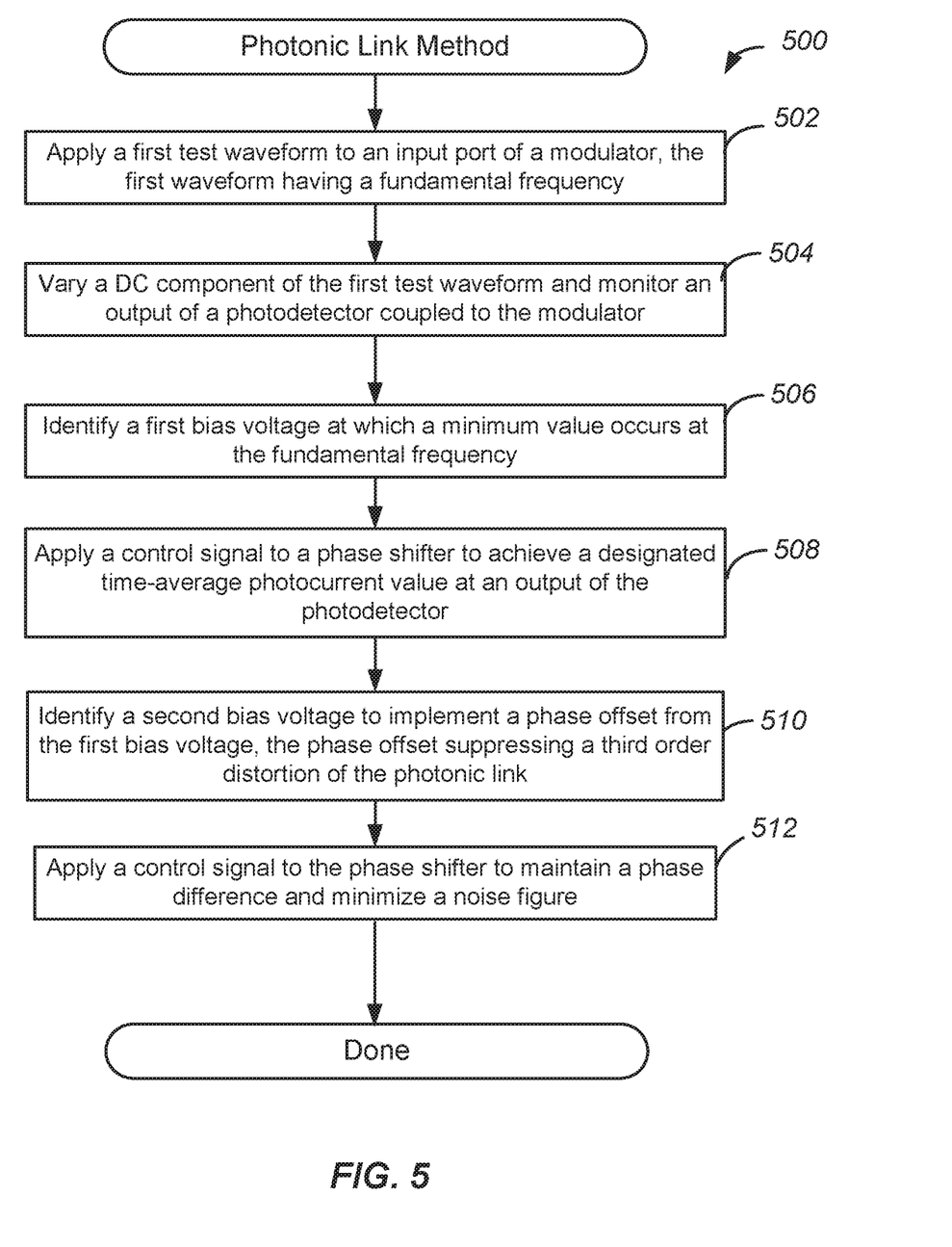
FIG. 5 illustrates a flow chart of another method of using a photonic link, implemented in accordance with some embodiments.

FIG. 5 illustrates a flow chart of another method of using a photonic link, implemented in accordance with some embodiments. As will be discussed in greater detail below, a method, such as method 500, may be implemented to simultaneously suppress distortion characteristics of a photonic link as well as reduce noise characteristics of the photonic link. More specifically, a bias voltage may be used to suppress distortion characteristics, such as second or third order distortion, and a control signal may be used to reduce, and even minimize noise characteristics such as a noise figure.

Accordingly, method 500 may commence with operation 502 during which a first test waveform may be applied to an input port of a modulator. In various embodiments, the first test waveform has a fundamental frequency and is applied to a bias port of the modulator. The first test waveform may have a DC component and a time-varying component. For example, the first test waveform may be a single tone sinusoidal waveform.

Method 500 may proceed to operation 504 during which the DC component of the first test waveform may be varied, and an output of a photodetector coupled to the modulator may be monitored. Accordingly, effects of modulation of the DC component may be monitored via the output of the photodetector, and more specifically, and output at the fundamental frequency may be monitored.

Method 500 may proceed to operation 506 during which a first bias voltage may be identified. In various embodiments, the first bias voltage is a bias voltage at which a minimum value occurs at the fundamental frequency. Accordingly, the variations in the output of the photodetector monitored at operation 504 may identify a particular bias voltage at which the output of the photodetector at the fundamental frequency is reduced, and even minimized. In some embodiments, this first bias voltage may be a zero-bias set point. In one example, the first bias voltage may set a modulator bias angle to 0 degrees.

Method 500 may proceed to operation 508 during which a control signal may be provided to a phase shifter to achieve a designated time-average photocurrent value which may be determined based on one or more properties of the photonic link. In various embodiments, the designated time-average photocurrent value may be determined based on a low-frequency output of a bias tee, such as first bias tee 302 discussed above. In various embodiments, the photocurrent value may be measured at an output of the photodetector.

Moreover, the designated time-average photocurrent value may be a target value that corresponds to a relative phase angle. For example, an initial calibration procedure may have been previously implemented in which an average photocurrent values corresponding to relative phase angles may have been determined and stored. Accordingly, a designated time-average photocurrent value may have been previously identified for a relative phase angle of 180 degrees, and during operation 508, the bias voltage applied to the phase shifter may be adjusted until the output of the photodetector achieves the designated time-average photocurrent value. In various embodiments, an average photocurrent value depends strongly on the value of the relative phase angle between paths. Moreover, that average photocurrent value has only a weak dependence on the value of the modulator bias angle if the bias angle is close to zero. In some embodiments, a desired value for the average photocurrent depends on the relative levels of laser power coupled, for example, from emitter 102 via coupler 104 into the first path containing modulator 204 versus into the second path containing phase shifter 108.

Method 500 may proceed to operation 510 during which a second bias voltage may be identified. In various embodiments, the second bias voltage is a voltage that implements a phase offset relative to the first bias voltage. Furthermore, the phase offset may be selected such that the implementation of the phase offset suppresses a distortion characteristic of the photonic link. For example, the implementation of the phase offset may suppress a third order distortion of the photonic link.

Method 500 may proceed to operation 512 during which a control signal is provided to the phase shifter. Accordingly, the control signal may be adjusted to maintain a phase difference between the modulator output and the phase shifter output even after the application of the second bias voltage. In this way, the control signal provided to the phase shifter reduces a noise characteristic of the photonic link. For example, the adjusted control signal may minimize a noise figure of the photonic link. An estimate of the noise figure may be determined from the measured values of the DC component of the photodetector output and the fundamental-frequency component of the photodetector output. In some embodiments, the fundamental-frequency component is obtained at an output of a bias tee, such as second bias tee 304. In some embodiments, the phase difference is set at 180 degrees.

As noted above, a similar methodology may be implemented for suppressing 2nd order distortion and 2nd harmonic spurs. More specifically, a system component, such as a controller, may extract a 2nd harmonic frequency of a test tone, and may then adjust the modulator bias voltage to reduce or minimize that 2nd harmonic component. The control signals for the phase shifter as well as the other control signals may be then be generated, as discussed above, but with regards to the bias voltage determined for the $2^{nd}$ harmonic component.

Figure 6:
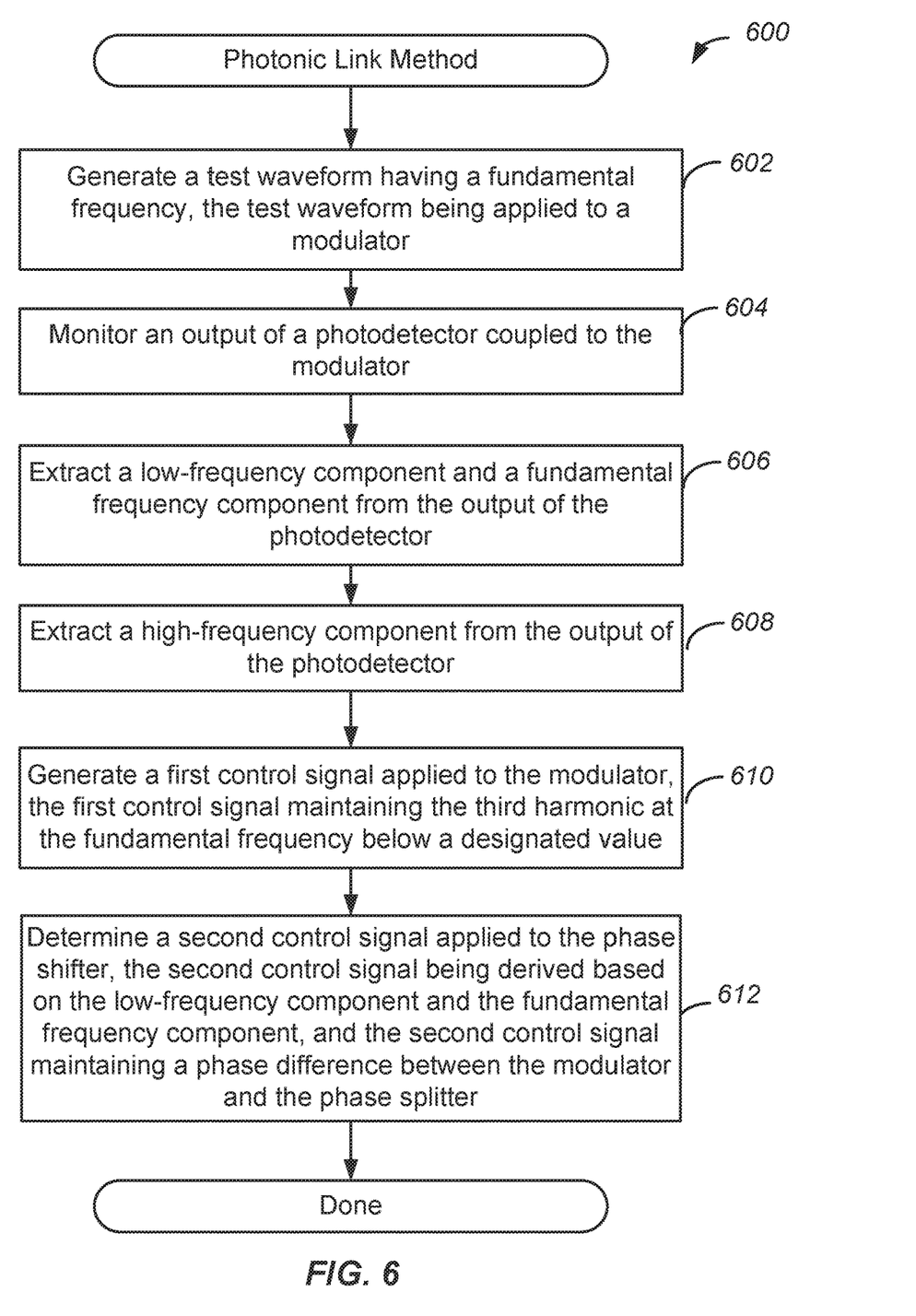
FIG. 6 illustrates a flow chart of yet another method of using a photonic link, implemented in accordance with some embodiments.

FIG. 6 illustrates a flow chart of yet another method of using a photonic link, implemented in accordance with some embodiments. For example, another method, such as method 600, may be implemented to simultaneously suppress distortion characteristics of a photonic link as well as reduce noise characteristics of the photonic link. More specifically, control signals may be generated based on extracted frequency components, and may be used to suppress distortion characteristics, such as second or third order distortion, as well as reduce, and even minimize noise characteristics such as a noise figure.

Accordingly, method 600 may commence with operation 602 during which a test waveform may be generated and applied to an input port of a modulator. In various embodiments, the test waveform has a fundamental frequency and is applied as a bias voltage to a bias port of the modulator.

Method 600 may proceed to operation 604 during which an output of a photodetector coupled to the modulator may be monitored. Accordingly, a system component, such as a controller, may monitor an output of the photodetector in order to obtain information used for the generation of control signals described in greater detail below with reference to operations 606-610.

Method 600 may proceed to operation 606 during which a low-frequency component and a fundamental frequency component may be extracted from the output of the photodetector. As discussed above, one or more components of a system component, such as a controller, may be used to extract the low-frequency and fundamental frequency components. In various embodiments, bias tees included in the controller are configured to extract the specific frequency components.

Method 600 may proceed to operation 608 during which a higher-frequency component may be extracted from the output of the photodetector. In various embodiments, the high-frequency component may be a component such as a third-order harmonic of the fundamental frequency. This higher-frequency component may be obtained from an output of a component, such a coupler 306. Accordingly, during operation 608, a third-order harmonic of the fundamental frequency may be extracted.

Method 600 may proceed to operation 610 during which a first control signal may be generated. In various embodiments, the first control signal is generated based on a monitored third order harmonic of the photodetector output. Accordingly, the first control signal is configured to maintain a distortion characteristic of the photonic link below a designated value. For example, the first control signal may maintain a third order harmonic of the fundamental frequency below a designated threshold value. In various embodiments, the designated threshold value is a predetermined value stored during a configuration process.

Method 600 may proceed to operation 612 during which a second control signal may be generated and applied to the phase shifter. In various embodiments, the second control signal is generated based on a monitored low-frequency component and a fundamental frequency component of the photodetector output. In this way, the second control signal is generated based on both of these monitored components. The second control signal is configured to maintain a phase difference between the modulator and the phase shifter. For example, the second control signal may maintain a phase difference between the modulator and the phase shifter at a phase angle of 0 degrees or 180 degrees. In this way, the second control signal reduces a noise characteristic of the photonic link. For example, the second control signal may minimize a noise figure of the photonic link by maintaining this relative phase between the two paths.

Aircraft and Spacecraft Examples

Figure 7:
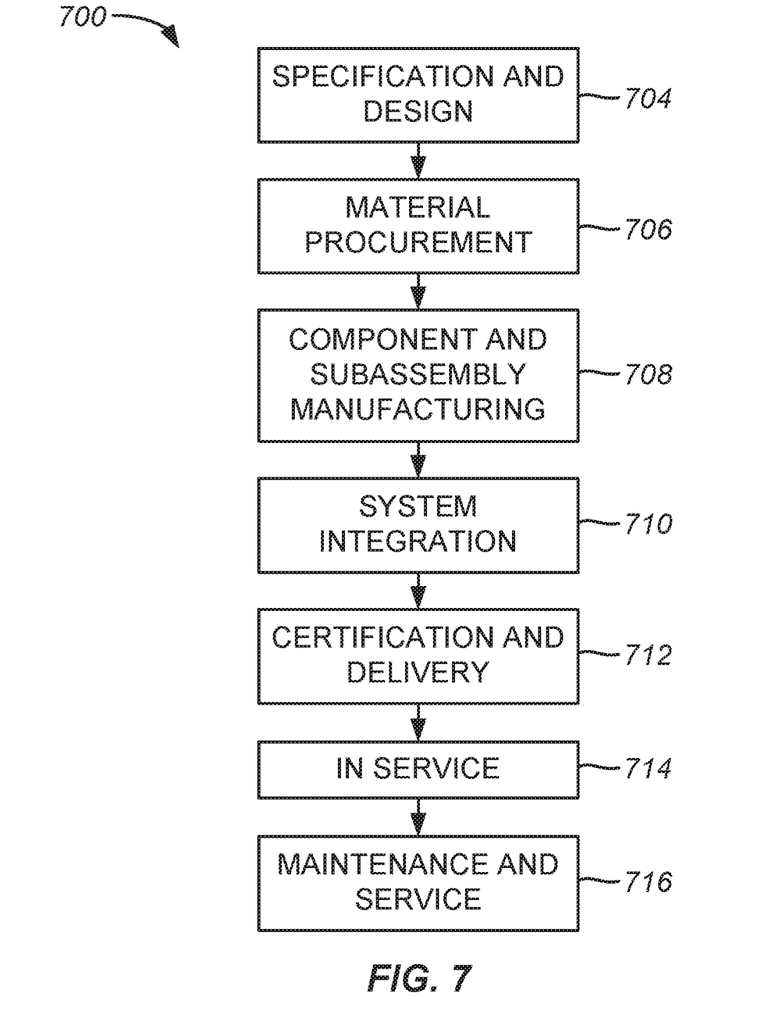
FIG. 7 illustrates a flow chart of an example of an aircraft production and service methodology, implemented in accordance with some embodiments.
Figure 8:
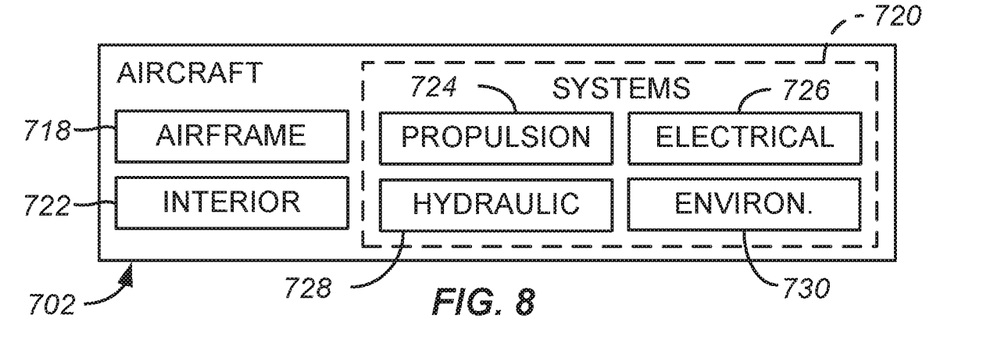
FIG. 8 illustrates a block diagram of an example of an aircraft, implemented in accordance with some embodiments.

As discussed above, various examples of photonic links disclosed herein, such as those discussed above with reference to FIGS. 1-6, may be integrated with aircraft and spacecraft. Accordingly, the manufacture of such photonic links may be described in the context of an aircraft manufacturing and service method 700 as shown in FIG. 7 and an aircraft 702 as shown in FIG. 8. During pre-production, illustrative method 700 may include specification and design 704 of aircraft 702 and material procurement 706. During production, component and subassembly manufacturing stages 708 and system integration stage 710 of aircraft 702 takes place. Thereafter, aircraft 702 may go through certification and delivery 712 in order to be placed in service 714. While in service by a customer, aircraft 702 is scheduled for routine maintenance and service 716 (which may also include modification, reconfiguration, refurbishment, and so on).

Each of the processes of method 700 may be performed or carried out by a system integrator, a third party, and/or an operator (e.g., a customer). For the purposes of this description, a system integrator may include without limitation any number of aircraft manufacturers and major-system subcontractors; a third party may include without limitation any number of vendors, subcontractors, and suppliers; and an operator may be an airline, leasing company, military entity, service organization, and so on.

As shown in FIG. 8, aircraft 702 produced by illustrative method 700 may include an airframe 718 with plurality of systems 720 and an interior 722. Examples of high-level systems 720 include one or more of a propulsion system 724, an electrical system 726, a hydraulic system 728, and an environmental system 730. Any number of other systems may be included. In various examples, photonic links, such as systems and devices discussed above with reference to FIGS. 1-6, may be implemented with systems included in systems 720 or components implemented in interior 722. Although an aerospace example is shown, the principles of the examples described herein may be applied to other industries.

Devices and methods embodied herein may be employed during any one or more of the stages of method 700. For example, components or subassemblies corresponding to stages 708 and 710 may be fabricated or manufactured in a manner similar to components or subassemblies produced while aircraft 702 is in service. Also, one or more device examples, method examples, or a combination thereof may be utilized during stages 708 and 710, for example, by substantially expediting assembly of or reducing the cost of an aircraft 702. Similarly, one or more of device examples, method examples, or a combination thereof may be utilized while aircraft 702 is in service, for example and without limitation, to maintenance and service 716.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method of using a photonic link, the method comprising:
transmitting light using an optical emitter;
splitting, using an input coupler, the light into a first path and a second path, the first path being provided to a modulator, and the second path being provided to a phase shifter;
combining, using an output coupler, an output of the modulator and an output of the phase shifter;
identifying a phase angle of the modulator at which a third order distortion is reduced at an output of the output coupler, wherein the phase angle corresponds to a relative phase of the modulator, and wherein the phase angle is identified based, at least in part, on the use of a test waveform with a varying direct current (DC) component;
applying a first bias voltage to a modulator to maintain the identified phase angle; and
applying a control signal to the phase shifter to maintain a phase difference between an output of the modulator and an output of a phase shifter, the control signal being generated based, at least in part, on one or more frequency components extracted from the output coupler.

2. The method of claim 1 further comprising:
coupling, using the output coupler, an output of the modulator and an output of the phase shifter; and
monitoring an output of a photodetector coupled to an output of the output coupler.

3. The method of claim 2 further comprising:
extracting a low frequency component and a fundamental frequency component of an output of a photodetector coupled to the output coupler.

4. The method of claim 3 further comprising:
determining the control signal based, at least in part, on the low frequency component and the fundamental frequency component.

5. The method of claim 4 further comprising:
determining the control signal based, at least in part, on the low frequency component and the fundamental frequency component as well as the output of the modulator.

6. The method of claim 1 further comprising:
receiving, at the modulator, a radio frequency (RF) signal from an antenna.

7. The method of claim 6, wherein the antenna is mounted, at least in part, on an exterior surface of an aircraft.

8. The method of claim 1 further comprising:
determining the first bias voltage by achieving a minimum value of a fundamental frequency of a test waveform.

9. The method of claim 8 further comprising:
determining a second bias voltage to implement a phase offset from the first bias voltage, the phase offset suppressing a third order distortion.

10. A system configured to implement a photonic link, the system comprising:
an optical emitter;
an input coupler configured to split an output of the optical emitter into a first path and a second path;
a modulator configured to modulate light transmitted along the first path based on an RF signal;
a phase shifter configured to modify a phase of light transmitted along the second path based on a bias voltage; and
a controller configured to:
identify a phase angle of the modulator at which a third order distortion of the photonic link is reduced, wherein the phase angle corresponds to a relative phase of the modulator, and wherein the phase angle is identified based, at least in part, on the use of a test waveform with a varying direct current (DC) component;
apply a first bias voltage to the modulator to maintain the identified phase angle; and
apply a control signal to the phase shifter to maintain a phase difference between an output of the modulator and an output of the phase shifter, the control signal being generated based, at least in part, on one or more frequency components extracted from an output coupler.

11. The system of claim 10 further comprising:
the output coupler coupled to the output of the modulator and the output of the phase shifter; and
a photodetector coupled to an output of the output coupler.

12. The system of claim 11, wherein the controller is configured to extract a low frequency component and a fundamental frequency component of an output of the photodetector.

13. The system of claim 12, wherein the controller is configured to determine the first bias voltage and the control signal based, at least in part, on the low frequency component and the fundamental frequency component.

14. The system of claim 13, wherein the first bias voltage is applied to the modulator and wherein the control signal is applied to the phase shifter via a processor included in the controller.

15. The system of claim 11, wherein the modulator is coupled to an antenna, and wherein the modulator and the antenna are implemented in a vehicle.

16. The system of claim 15, wherein the vehicle is an aircraft, and wherein the antenna is mounted, at least in part, on an exterior surface of the aircraft.

17. A device comprising:
a modulator configured to receive a first optical signal from an optical emitter via a first path, the modulator being configured to modulate light transmitted along the first path based on an RF signal;
a phase shifter configured to receive a second optical signal from the optical emitter via a second path, the phase shifter being configured to modify a phase of light transmitted along the second path based on a bias voltage; and
a controller configured to:
identify a phase angle of the modulator at which a third order distortion is reduced, wherein the phase angle corresponds to a relative phase of the modulator, and wherein the phase angle is identified based, at least in part, on the use of a test waveform with a varying direct current (DC) component;
apply a first bias voltage to the modulator to maintain the identified phase angle; and
apply a control signal to the phase shifter to maintain a phase difference between an output of the modulator and an output of the phase shifter, the control signal being generated based, at least in part, on one or more frequency components extracted from an output coupler.

18. The device of claim 17, wherein the modulator is coupled to an antenna, and wherein the modulator and the antenna are implemented in an aircraft.

19. The device of claim 17, wherein the controller is configured to extract a low frequency component and a fundamental frequency component of an output of a photodetector.

20. The device of claim 19, wherein the controller is configured to determine the first bias voltage and the control signal based, at least in part, on the low frequency component and the fundamental frequency component.

* * * * *